United States Patent [19]
Garnett

[11] 4,345,678
[45] Aug. 24, 1982

[54] ROLLER CONVEYORS

[76] Inventor: David M. Garnett, Thorpe Arch Trading Estate, Wetherby, Yorkshire, England, LS23 7BL

[21] Appl. No.: 107,200

[22] Filed: Dec. 26, 1979

[30] Foreign Application Priority Data

Sep. 7, 1979 [GB] United Kingdom ............... 7931143

[51] Int. Cl.³ .............................................. B65G 39/09
[52] U.S. Cl. ................................... 193/35 R; 308/20; 193/37
[58] Field of Search ................ 193/35 R, 37; 308/20, 308/182, 187, 187.1, 187.2, 188, 184 A, 189 R, 18, 216, 235; 29/116 R, 110; 198/780

[56] References Cited
U.S. PATENT DOCUMENTS 3,416,638 12/1968 Buck ............................ 193/35 R X
3,631,954 1/1972 Coaley ......................... 308/184 A
3,894,323 7/1975 Hamlen ........................ 198/780 X
4,213,523 7/1980 Frost et al. ..................... 193/37

Primary Examiner—John J. Love
Assistant Examiner—Gene A. Church
Attorney, Agent, or Firm—David A. Jackson

[57] ABSTRACT

Rollers are provided for roller conveyors. The roller comprises a sleeve body receiving roller bearings in the ends thereof, the bearings receiving a spindle. One race of each bearing supports the sleeve body, whilst the other has a bore engaged by the spindle. The engagement between the said bore and spindle is by means of a flexible seal so that the bearing can slide relative to the spindle in an axial direction, but the seal prevents flow of water along the spindle. There may be a single spindle extending through both bearings of each roller, or there may be two stub axles, one for each bearing. The races of the bearings are preferably of plastics material.

13 Claims, 3 Drawing Figures

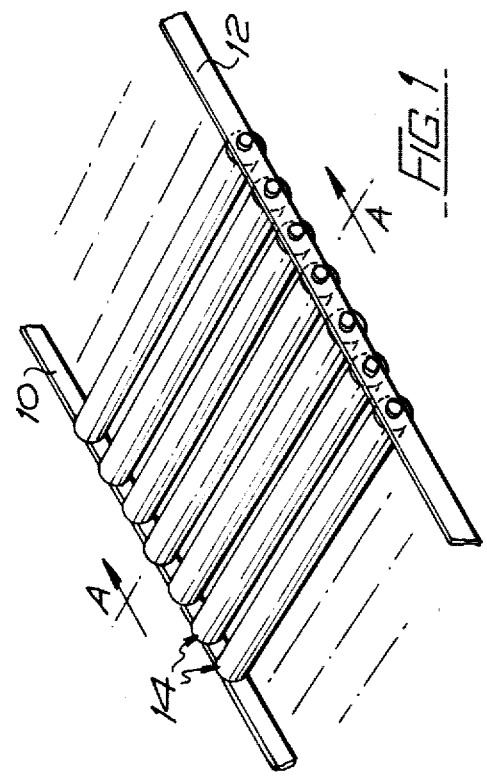
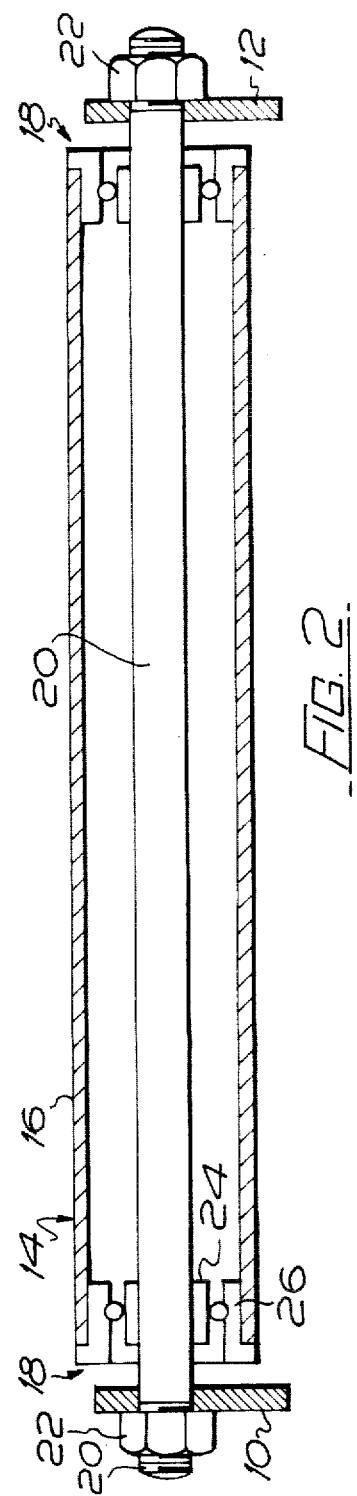

ROLLER CONVEYORS

This invention relates to conveyor rollers for use in roller conveyors and to roller conveyors.

Roller conveyors are used extensively in industry when it is desired to provide a transportation system for products, boxes or the like extending for example between locations in a factory or from a despatch location to a location from which goods to be shipped can be loaded into a transportation vehicle. The conveyor comprises rollers which in fact combine to define a transportation surface or decking and these conveyor roller systems can be used for the transportation of large and small articles and objects alike, although we are primarily concerned with conveyor roller systems for the transportation of manually handleable items such as frozen chickens, loaves of bread, or boxes of articles such as tins of beans, and so on.

A conveyor roller essentially is a relatively simple article and comprises normally a sleeve body in the ends of which are located bearing assemblies. Means defining a spindle supported by a surrounding frame engages in the bearing assemblies whereby the sleeve body is free to rotate relative to the axis defined by the spindle.

Although these rollers essentially are simple in nature, not much attention has been given to their design, and in fact the bearing assemblies which are still extensively used throughout the world are somewhat primitive and inefficient. For example, it is known to provide bearing assemblies which are simply plastic or wooden blocks, the spindle means locating directly in a bore in the wooden block or plastic block in sliding relationship therewith. Other known arrangements use roller bearings in the bearing assemblies, but these roller bearings traditionally have been constructed of steel but such bearings have been and are liable to corrosion, as frequently the conveyor rollers must work in corrosive environments, at the very least where water and air are present, which gives rise to rusting of the bearings and their eventual siezure or dramatic reduction in their efficiency. It is imperative that the conveyor rollers be extremely free running, especially where they are used in a gravity conveyor roller systems in which the decking is inclined, and the goods moved along the roller decking by virtue of gravity. The discussed prior art roller systems have not been directed to the needs of and problems associated with conveyor roller systems.

Furthermore, in conveyor systems the demand for the bearings of each roller to be high accuracy machined components is not as great as in other engineering applications and consequently I have in fact devised bearing assemblies for conveyor rollers which are constructed from plastics material, and I have found that tolerances can be reasonably generous compared with precision made steel roller bearings, without any deleterious effect on the operation of the bearings, and indeed in some case the generous tolerances enhance the operation of the roller as they make it run freer.

The ability of the roller to run freely is in fact of prime importance in a conveyor roller system, and care must be taken to ensure that the bearing assemblies at the ends of the sleeve body are not loaded axially one relative to the other, either when the roller is assembled or when it is placed in position in the conveyor system frame. Considering firstly the conveyor system frame mounting, if the roller bearing is wedged into the frame, and the bearing assemblies at the ends of the sleeve body are roller bearings having inner and outer races, if the frame for example bears upon the inner races of the end bearings and urges them axially together, there will be a loading axially of the roller on the rolling elements on the bearings, preventing free-running of the sleeve body on the rolling elements. Equally, if the spindle means is a long spindle which extends through the end bearings, if the fit between the spindle means and the inner races, for example, is so much of an interference fit that insertion of the spindle means requires considerable effort, this can in fact impose a similar type of axial loading on the inner races, and hence on the rolling elements with the result that optimum free running of the sleeve body is not achieved. It is desirable in fact that when the roller is fitted in the roller transport system, the sleeve body should be capable of a limited degree of free axial movement relative to the spindle means. This is provided by ensuring that the bearing assemblies are a sliding fit on the spindle, means being provided to ensure that the degree of sliding of the bearings on the spindle means is limited.

In accordance with the invention there is provided a roller for a roller conveyor, said roller comprising a sleeve body receiving roller bearings in the ends thereof, at least one of the bearings comprising an inner race and an outer race of which one is in operative connection with the sleeve body, whilst the other is mounted on spindle means, and the race which is in operative connection with the spindle means is in use stationery and receives the spindle means with clearance, the bearing including a flexible seal sealing the said race to the spindle but allowing at least limited relative axial movement of the spindle means and said race.

It should be mentioned that the spindle means may be a single spindle for extending between spaced supports of the frame and extending through both bearings. Alternatively, the spindle means may be defined by separate stub shafts which are respectively for support in spaced frame members, but which are engaged in the respective bearings, and do not extend completely through the roller.

The invention can be applied to driven rollers as well as gravity rollers.

An embodiment of the present invention will now be described, by way of example, with reference to the accompanying drawings, wherein:

FIG. 1 is a respective view of part of a roller conveyor transport system;

FIG. 2 is a sectional elevation, taken on the line A—A in FIG. 1 showing detail of a roller of which several are shown in FIG. 1, FIG. 2 being diagrammatic in the bearing assembly constructional details.

Figure 3:
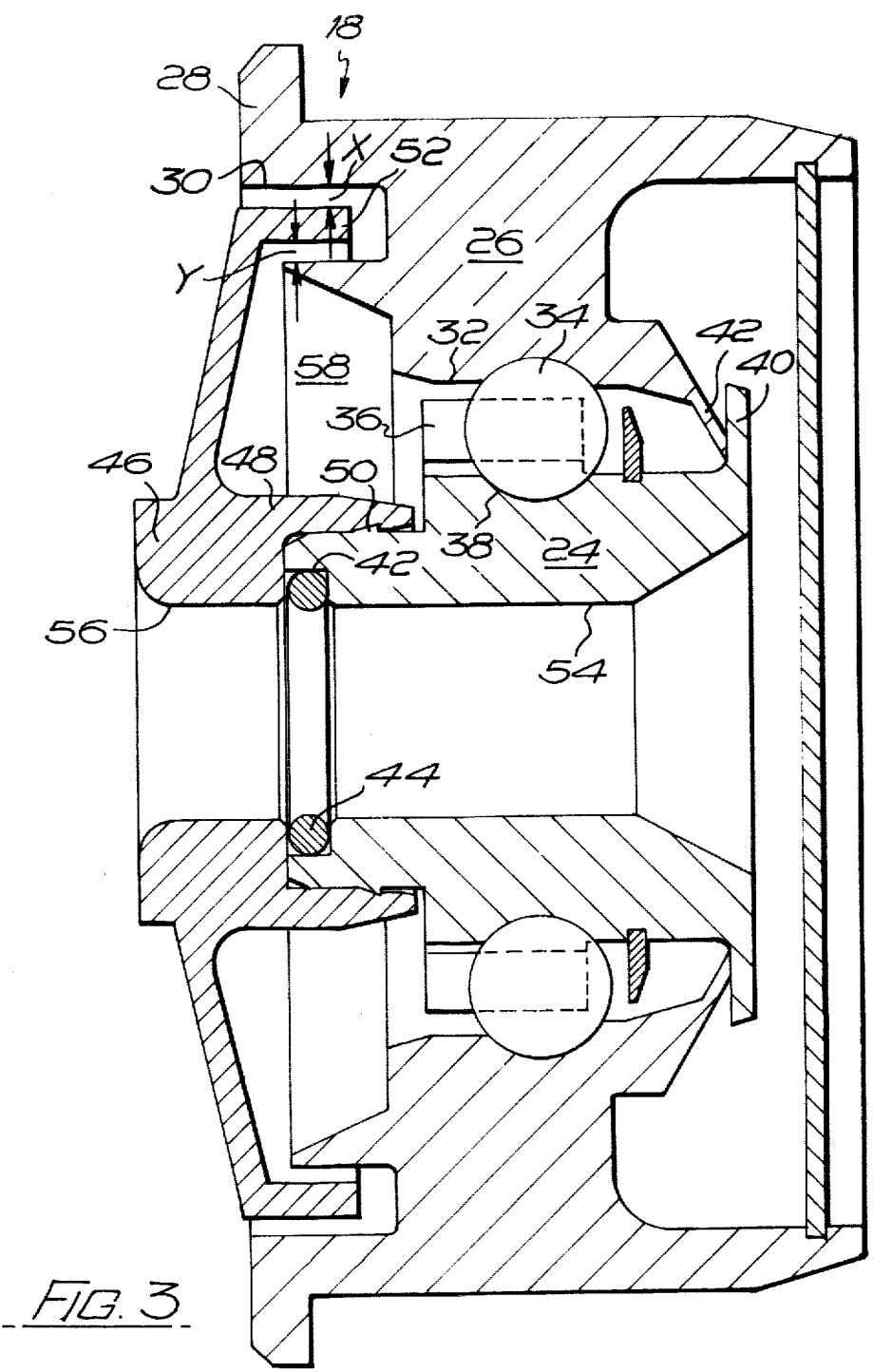
FIG. 3 is a sectional elevation showing a bearing assembly for use in the roller illustrated in FIG. 2.

Referring to the drawings, in FIG. 1 there is shown a section of a simple roller conveyor transport system comprising a pair of parallel side frame members or bars 10, 12, between which extend, in parallel fashion the conveyor rollers 14. It should be mentioned that the arrangement illustrated is an extremely simple version of a roller conveyor transport system, and it has been illustrated in simplified fashion for the purpose of explanation. In practice these systems can be much more complicated in having curves, parallel rows of rollers and so on. The present invention is however concerned with the roller, and not with the particular conveyor layout.

Each of the rollers 14 is diagrammatically indicated in FIG. 2, and will be seen to comprise a sleeve body 16 in the ends of which are press fitted bearing assemblies 18. The bearing assemblies are on a central spindle 20 which passes through suitable apertures in the frame members 10 and 12, the spindle 20 being shown as anchored in fixed position by means of end nuts 22 which engage threaded ends of the spindle 20.

Each of the bearing assemblies 18 is shown in FIG. 2 to comprise an inner race 24 engaged in the spindle 20 and an outer race 26 over which the sleeve body 16 is frictionally engaged. In FIG. 2, the bearing assemblies are shown in much simplified form, but FIG. 3 shows in detail the construction of the bearing assembly 18 located at the left hand of the roller shown in FIG. 2. The bearing 18 at the right hand of the roller is of identical construction.

Referring now to FIG. 3, the bearing assembly 18 is shown in detail, and it will be seen that the outer bearing race 26 is provided with a flange 28 against which the sleeve body 16 can abut when it is friction fitted thereon. Additionally, towards the outside of the bearing, the outer race 26 is provided with a labyrinth cavity 30. An outer race bearing surface 32 is engaged by the ball rolling elements 34 of the bearing assembly, said bearing elements 34 being held in correct space disposition by means of a cage 36.

The inner race 24 is provided with a ball race surface 38 which is engaged by the said balls 36, and is also provided at its inner end with an outwardly directed flange 40 which is engaged by a conical lip seal 42 formed integrally in the outer race 26.

At its outer end, the inner race 24 is provided with a shoulder 42 in which is engaged a rubber O-ring seal 44, the seal 44 being prevented from falling from the bearing assembly by means of an end cap 46. The end cap 46 has an inwardly projecting ring 48 which snaps over a locating ring of the inner race, the engagement being retained by means of the conical projecting ring 50 on the inner race engaging a corresponding groove on the inner surface of ring 48.

The cap 46 has a labyrinth sealing ring 52 which lies in the labryinth groove 30 of the outer race with clearance of particular dimensions as will be explained.

It will be noticed that the inner race 24 has a bore 54 of a suitable size to receive the spindle 20, and also the cap 46 has a bore 56 which is idential in size to and co-axial with the bore 54, so that the spindle can pass through the bearing assembly. It is to be mentioned that the O-ring seal 44 has an inner diameter which is slightly less than the common bore 56/54, and the spindle 20 is adapted to be received in the common bore 56/54 with clearance, so that in actual fact the seal between the spindle 20 and the bearing assembly along the bore 56/54 is in fact by contact between the O-ring seal 44 and the spindle 20 and not between the bore surfaces 56/54 and the spindle 20. This constitutes a significant departure in construction in a bearing assembly of this type, and also enables the bearing assembly to have the necessary axial freedom to float on the spindle as referred to herein, which is important for the prevention of pre-loading of the respective bearings 18 in a roller, which gives rise to friction running of the outer sleeve body 16. It will be noted that there is in fact no relative rotation between the spindle 20 and the inner race 24 and its end cap 46, and therefore the seal 44 provides an effective means for preventing the ingress of water into the inside of the sleeve body along the spindle 20.

The labyrinth gap has been referred to herein, and by this gap is meant the dimension such as dimension X or dimension Y between the relatively rotating surfaces of the labyrinth groove 30 and the labyrinth ring 52. It is also important that the labyrinth diameter be greater than the pitch circle diameter of the balls 38 for a purpose which will be clear from the following.

The bearing assembly is in use located in the disposition shown in FIG. 3, and when liquid falls in the bearing assembly or is sprayed thereonto for the purposes of washing same, the liquid will flow into the bearing assembly through the gaps X and Y, and will tend to fill the interior of the bearing assembly for example, in cavity 58, and around the balls and ball cage, and finally in the vicinity of the seal 42 and the flange 40. The liquid would accumulate were it not for the fact that the dimensions X and Y which although shown at the top of the bearing assembly of course also exist at the bottom of the bearing assembly as the components are rotary, and these clearances are designed such as to allow the liquid to run out of the bearing assembly. The unit is therefore designed to resist ingress of water and other liquids, but is not made so narrow that the ingress of water out of the bottom of the bearing through the same labyrinth gaps is prevented. From a practical point of view, we have achieved excellent results in the case where the diameter of the labyrinth ring 52 is of the order of 47 mm, when the X and Y spacing are made of the order of 2 mm, and preferably in the range 1.7 to 2.3 mm. When the bearing was tested with the labyrinth gaps X and Y were of the order of 1.3 mm the test liquid flowed into the bearing, but could not escape at the bottom end, and therefore filtered into the interior of the sleeve 16.

The seal arrangement 40 and 42 without the labyrinth seal was found not to be completely effectively, for the reason that the bearing illustrated, being completely of plastics material, except for the balls 34 which were of stainless steel to resist corrosion, and the O-ring seal 44 which was of rubber, had considerable tolerances in the interfitting of the parts, and in fact it is found that with the fitting of the sleeve body to the outer race 26, if the end of the sleeve body is not in a plane exactly at right angles to the sleeve body axis, and it is unusual to achieve such accuracy, because the sleeve bodies are usually cut from extruded plastic pipe, there tends to be a loading on the outer race 26 making it slightly tilted relative to the inner race 24, and this tilting results in the seal 40/42 becoming less than perfect. An important feature therefore is in fact the design of the labyrinth seal as has been explained herein.

It is to be understood that the invention is not limited to the illustrations described and shown herein, which are deemed to be merely illustrative of the best modes of carrying out the invention, and which are suitable of modification of form, size, arrangement of parts and details of operation. The invention rather is intended to encompass all such modifications which are within the spirit and scope and defined by the claims.

What is claimed is:

1. A roller for a roller conveyor, said roller comprising a sleeve body receiving roller bearings in the ends thereof, at least one of the bearings comprising an inner race and an outer race of which one is in operative connection with the sleeve body, whilst the other is mounted on spindle means, and the race which is in operative connection with the spindle means is in use stationery and receives the spindle means with clearance, the bearing including a flexible seal positioned between said race and said spindle sealing the said race to the spindle but allowing at least limited relative axial movement of the spindle means and said race.

2. A roller according to claim 1, wherein each of the bearings comprises an inner race and an outer race of which one is adapted in operative connection with the sleeve body, whilst the other is mounted on spindle means, and the race which is in operative connection with the spindle means is in use stationery and receives the spindle means with clearance, the bearing including a flexible seal sealing the said race to the spindle but allowing at least limited relative axial movement of the spindle means and said race.

3. A roller according to claim 2, wherein of each roller bearing the inner race has a bore engaged by the spindle and the outer race engages the sleeve body.

4. A roller according to claim 3, wherein the inner race of each bearing receives a cap having a bore co-axial with and of the same size as the bore of the inner race, the race and cap trapping an O-ring seal therebetween which forms the flexible seal.

5. A roller according to claim 4, wherein the cap and inner race of each bearing are of plastics material and are snap-fitted together.

6. A roller according to claim 1, wherein the spindle means comprises a single spindle extending through both bearings of the roller.

7. A roller conveyor comprising a plurality of conveyor rollers each roller comprising a sleeve body receiving roller bearings in the ends thereof, at least one of the bearings comprising an inner race and an outer race of which one is in operative connection with the sleeve body, whilst the other is mounted on spindle means, and the race which is in operative connection with the spindle means is in use stationery and receives the spindle means with clearance, the bearing including a flexible seal positioned between said race and said spindle sealing the said race to the spindle but allowing at least limited relative axial movement of the spindle means and said race.

8. A roller conveyor according to claim 7, wherein each of the bearings comprises an inner race and an outer race of which one is in operative connection with the sleeve body, whilst the other is mounted on spindle means, and the race which is in operative connection with the spindle means is in use stationery and receives the spindle means with clearance, the bearing including a flexible seal sealing the said race to the spindle but allowing at least limited relative axial movement of the spindle means and said race.

9. A roller conveyor according to claim 8, wherein of each roller bearing the inner race has a bore engaged by the spindle and the outer race engages the sleeve body.

10. A roller conveyor according to claim 7, wherein the inner race of each bearing receives a cap having a bore co-axial with and of the same size as the bore of the inner race, the race and cup trapping an O-ring seal therebetween which forms the flexible seal.

11. A roller conveyor according to claim 10, wherein the cap and inner race of each bearing are of plastics material and are snap-fitted together.

12. A roller conveyor according to claim 7, wherein the spindle means of each roller comprises a single spindle extending through both bearings of the roller the ends of the spindle being supported by spaced frame members.

13. A roller conveyor according to claim 7, wherein the spindle means of each roller comprises two stub axles, one engaging each bearing, the stub axles being supported by spaced frame members.

* * * * *